United States Patent
Chan et al.

(10) Patent No.: US 7,303,012 B2
(45) Date of Patent: Dec. 4, 2007

(54) PROPPED FRACTURE WITH HIGH EFFECTIVE SURFACE AREA

(75) Inventors: Keng S. Chan, Kuala Lumpar (MY); J. Ernest Brown, Katy, TX (US); Arthur William Milne, Caracas (VE); Brett Rimmer, Sugar Land, TX (US); Mark Brady, Doha (QA)

(73) Assignee: Schlumberger Technology Corporation, Sugarland, TX (US)

( * ) Notice: Subject to any disclaimer, the term of this patent is extended or adjusted under 35 U.S.C. 154(b) by 61 days.

(21) Appl. No.: 11/565,123

(22) Filed: Nov. 30, 2006

(65) Prior Publication Data

US 2007/0102155 A1    May 10, 2007

(51) Int. Cl.
 *E21B 43/267* (2006.01)
 *E21B 43/27* (2006.01)

(52) U.S. Cl. .................. 166/280.1; 166/282; 166/307; 166/308.2

(58) Field of Classification Search ............. 166/280.1, 166/282, 283, 307, 308.1, 308.2, 308.3, 308.5; 507/237, 241, 277, 923, 933, 934
See application file for complete search history.

(56) References Cited

U.S. PATENT DOCUMENTS

| | | | | |
|---|---|---|---|---|
| 3,380,529 A | * | 4/1968 | Hendrickson | 166/295 |
| 3,601,197 A | * | 8/1971 | Ayers et al. | 166/307 |
| 3,642,068 A | * | 2/1972 | Fitch et al. | 166/307 |
| 3,703,928 A | * | 11/1972 | Fulford | 166/275 |
| 3,734,186 A | * | 5/1973 | Williams | 166/282 |
| 3,768,564 A | * | 10/1973 | Knox et al. | 166/307 |
| 4,322,306 A | * | 3/1982 | Dill | 507/236 |
| 5,054,554 A | * | 10/1991 | Pearson | 166/280.1 |
| 6,637,517 B2 | * | 10/2003 | Samuel et al. | 166/381 |
| 6,749,022 B1 | * | 6/2004 | Fredd | 166/250.1 |
| 7,084,095 B2 | * | 8/2006 | Lee et al. | 507/261 |
| 2002/0170715 A1 | * | 11/2002 | Frenier | 166/307 |
| 2003/0062160 A1 | * | 4/2003 | Boney et al. | 166/278 |
| 2003/0106690 A1 | * | 6/2003 | Boney et al. | 166/280 |
| 2003/0139298 A1 | * | 7/2003 | Fu et al. | 507/200 |

* cited by examiner

*Primary Examiner*—George Suchfield
(74) *Attorney, Agent, or Firm*—Darla Fonseca; David Cate; Robin Nava

(57) ABSTRACT

Propped fractures in formations from which fluids are produced are described that have wormholes extending out into the formations from the faces of the fractures at locations distant from boreholes. Methods are given for creating such propped fractures having wormholes in which either a closed propped fracture is formed and then the wormholes are formed, or the entire fracture and channel system is formed before the closure occurs.

12 Claims, 2 Drawing Sheets

PROPPED FRACTURE WITH HIGH EFFECTIVE SURFACE AREA

BACKGROUND OF INVENTION

This invention relates to improving the production of fluids from wells penetrating subterranean formations. More specifically it relates to a method for increasing the ability of fractures to drain formations. In particular it relates to propped fractures, that have wormholes extending from the faces of the fractures into the formation, and methods of creating such fractures.

The flow of fluids through porous media, for example the production of fluids from wells, is governed by three principle factors: the size of the flow path, the permeability of the flow path, and the driving force.

It is often necessary to stimulate the production of fluids from subterranean formations when wells are not producing satisfactorily. The failure to produce is typically due to an inadequate, or a damaged, path for fluids to flow from the formation to the wellbore. This may be because the formation inherently has insufficient porosity and/or permeability, or because the porosity and/or permeability have been decreased (damaged) near the wellbore during drilling and/or completion and/or production. There are two main stimulation techniques: matrix stimulation and fracturing. Matrix stimulation is accomplished by injecting a fluid (e.g., acid or solvent) to dissolve and/or disperse materials that impair well production in sandstones or to create new, unimpaired flow channels between the wellbore and a carbonate formation. In matrix stimulation, fluids are injected below the fracturing pressure of the formation. Matrix stimulation, typically called matrix acidizing when the stimulation fluid is an acid, generally is used to treat only the near-wellbore region. In a matrix acidizing treatment, the acid used (typically hydrochloric acid for carbonates) is injected at a pressure low enough to prevent formation fracturing. It is desirable to take into account well and formation factors (such as temperature and formation composition) and adjust treatment parameters (such as acid strength and injection rate) so that dominant "wormholes" are formed which penetrate through the near wellbore area.

When acid is pumped into a formation, such as a carbonate (limestone or dolomite) formation, at pressures below the fracture pressure, the acid flows preferentially into the highest solubility or the highest permeability regions (that is, largest pores, vugs or natural fractures). Acid reaction in the high-solubility or high-permeability region ideally causes the formation of large, highly conductive flow channels called wormholes that form approximately normal to the fracture. The creation of wormholes is related to the rate of chemical reaction of the acid with the rock. High reaction rates, as observed between typical concentrations of unaltered mineral acids, such as HCl, and carbonates, tend to favor wormhole formation. Acids normally used in field treatments are highly reactive at reservoir conditions and tend to form a limited number of wormholes. A low reaction rate favors the formation of several small-diameter wormholes. However, unless the treatment is designed properly, wormholes are not formed. Instead, for example if the acid flux is too low, the acid reacts evenly with the formation, which is commonly called compact dissolution, dissolving all the rock near the wellbore and not penetrating deep into the formation and creating flow paths there. Wormholing is desirable in matrix acidizing.

In fracturing, on the other hand, a fluid is forced into the formation at a pressure above that at which the formation rock will part. This creates a greatly enlarged flow path. However, when the pressure is released, the fracture typically closes and the new flow path is not maintained unless the operator provides some mechanism by which the fracture could be held open. There are two common ways of doing this. In conventional propped hydraulic fracturing, the fluid that is used to generate or propagate the fracture is viscous and carries a solid proppant that is trapped in the fracture when the pressure is released, preventing the fracture from closing. In acid fracturing, also known as fracture acidizing, the fracture is generated or subsequently treated with an acid. In this case, however, the treatment parameters have in the past been adjusted so that wormholing did not occur. Instead, the object previously has been to etch the faces of the fracture differentially. Then, when the pressure is released, the fracture does not close completely because the differential etching has created an asperity between the faces so that they no longer match up and there are gaps where material has been removed. Ideally the differential etching forms flow channels, usually generally running along the faces of the fracture from the wellbore to the tip, that enhance production. In acid fracturing, wormholing was undesirable because in methods used previously it does not occur at many points along the fracture but rather primarily occurs only where the acid most easily or first contacts the formation. This is most typically near the wellbore, although if there are natural high-conductivity streaks, fissures, vugs, etc., there could be other locations with a high intensity of wormholes. This increases the amount of acid required (wastes acid that would otherwise be used to etch the conductive channels) and increases the pump rates required to propagate the fracture and keep the fracture open. Thus when there are wormholes near the wellbore in acid fracturing, large amounts of acid and high pump rates are required so that the fluid that reaches far out into the fracture, if a fracture can be formed at all, is still sufficiently acidic to react with the fracture faces. This situation is exacerbated by the fact that, even though the pump rate as seen at the wellhead can be high, the fluid velocity out in the fracture (affecting the rate at which fresh acid reaches that point) can be very low because the surface area of the fracture faces increases greatly as the fracture is propagating.

In production from a fracture-stimulated well, the extent of the available flowpath is a function of the size and shape of the fracture, and in particular of the effective surface area of the faces of the fracture. The permeability of the flowpath is the effective permeability of the fracture after closure, that is, the effective permeability of the proppant pack or of the etched channels. The driving force is the pressure differential between the fluid in the formation and the fluid in the wellbore. This driving force varies along the length of the fracture. The optimal fracture would be one with a large effective surface area and a high effective permeability. As it relates to maximizing production, this would be the equivalent of having a larger effective wellbore radius. It would therefore require only a small pressure drop to provide a high fluid flow rate out of the formation and into the wellbore.

In the past, the only way to generate a fracture with a high effective surface area for flow of fluids from the formation into the fracture was to generate a fracture that was either high (assuming a vertical fracture) or long (extending far from the borehole) or both, and the best way to generate a fracture having a high effective permeability was with proppant. Propped fractures having wormholes extending from their faces out into the formation, and methods of forming such fractures, would be highly desirable because they would have high effective surface areas and the wells would have high effective wellbore radii.

U.S. Pat. No. 3,768,564 discloses a process wherein unpropped fractures are allowed to close prior to prolonged contact with acid. Flow channels are etched while the fracture is held open, then expanded only after the fracture is allowed to close. U.S. Pat. No. 3,842,911 describes the use of propping agents in this process. It describes the formation of a fracture and the introduction of propping agent into the fracture, followed by the complete closure of the fracture on the propping agent and then injection of acid under conditions at which the fracture remains closed, allowing creation of flow channels a relatively long distance from the wellbore. U.S. Pat. No. 4,245,702 describes a process of fracturing and acidizing a well with the use of propping agents that is particularly applicable to relatively hard formations. U.S. Pat. No. 3,642,068 describes the creation of a fracture by means of a viscous medium followed by the passage of propping agents into the fracture. The agent is shifted to a remote location in the fracture by means of an acid that etches those parts of the fracture walls that are close to the borehole. Subsequently the fracture is closed. Formation of wormholes is not proposed in any of these fracturing methods.

SUMMARY OF INVENTION

One embodiment of the present invention is a flowpath, in a subterranean formation penetrated by a wellbore, that has one or more propped fractures having one or more primary channels (wormholes) extending from the fracture or fractures into the formation. In another embodiment, these primary channels have secondary channels (wormholes) extending from them. In either of these embodiments, the fracture has an increased effective surface area for the inflow of fluids into the fracture from the formation.

Another embodiment is a method of forming such flowpaths by carrying out the sequential steps of injecting a viscous carrier fluid containing proppant at a rate and pressure sufficient to fracture the formation and allowing the fracture to close, and then injecting a formation-dissolving fluid at a rate and pressure insufficient to fracture the formation. Especially in carbonates, the formation-dissolving fluid is preferably a self-diverting acid, an aminopolycarboxylic acid such as hydroxyethylethylenediamine triacetic acid, an aminopolycarboxylic acid salt such as trisodium hydroxyethylethylenediamine triacetate, preferably adjusted to a pH of about 4 with hydrochloric acid, or a mixture of an aminopolycarboxylic acid and an aminopolycarboxylic acid salt. In sandstones, the formation-dissolving fluid preferably contains hydrofluoric acid or a hydrofluoric acid precursor, and optionally contains a phosphonate. In the step of injecting the viscous carrier fluid containing proppant, a tip screenout may optionally be induced and a breaker may optionally be included in the fluid. In another embodiment, the step of injecting a formation-dissolving fluid at a rate and pressure insufficient to fracture the formation is performed remedially, that is, it is applied to a previously created fracture, from which production of fluids may have been attempted or achieved.

Yet another embodiment is a method of creating such flowpaths having an increased effective surface area for flow of fluids from the formation into a fracture due to the presence of wormholes distant from a wellbore in which a polymeric viscous carrier fluid containing proppant is injected at a rate and pressure sufficient to fracture the formation, then a formation-dissolving viscous carrier fluid containing proppant is injected at a rate and pressure sufficient to hold the fracture open (and optionally to propagate the fracture), and then the fracture is allowed to close. A tip screenout may optionally be induced in the first proppant-carrying step, and either carrier fluid may optionally contain a breaker. In carbonates, the formation-dissolving viscous carrier fluid is preferably a surfactant-based viscoelastic fluid, and most preferably a self-diverting acid. In sandstones, the formation-dissolving viscous carrier fluid preferably contains hydrofluoric acid or a hydrofluoric acid precursor, and optionally contains a phosphonate.

Yet another embodiment is a method of creating such flowpaths in which a formation-dissolving viscous fluid is first injected at a rate and pressure sufficient to fracture the formation, then a viscous carrier fluid containing proppant is injected at a rate and pressure sufficient to hold the fracture open, and then the fracture is allowed to close. Especially in carbonates, the formation-dissolving viscous fluid preferably contains a self-diverting acid, an aminopolycarboxylic acid such as hydroxyethylethylenediamine triacetic acid, an aminopolycarboxylic acid salt such as trisodium hydroxyethylethylenediamine triacetate, preferably adjusted to a pH of about 4 with hydrochloric acid, or a mixture of an aminopolycarboxylic acid and an aminopolycarboxylic acid salt. In sandstones, the formation-dissolving viscous fluid preferably contains hydrofluoric acid or a hydrofluoric acid precursor, and optionally contains a phosphonate. Either the formation-dissolving viscous fluid, the viscous carrier fluid, or both may optionally contain a breaker.

Yet another embodiment is a method of creating such flowpaths in which a viscous carrier fluid containing proppant is first injected at a rate and pressure sufficient to fracture the formation, then a formation-dissolving fluid is injected at a rate and pressure sufficient to hold the fracture open, and then the fracture is allowed to close. Especially in carbonates, the formation-dissolving fluid is preferably a self-diverting acid, an aminopolycarboxylic acid such as hydroxyethylethylenediamine triacetic acid, an aminopolycarboxylic acid salt such as trisodium hydroxyethylethylenediamine triacetate, preferably adjusted to a pH of about 4 with hydrochloric acid, or a mixture of an aminopolycarboxylic acid and an aminopolycarboxylic acid salt. In sandstones, the formation-dissolving fluid preferably contains hydrofluoric acid or a hydrofluoric acid precursor, and optionally contains a phosphonate. A tip screenout may optionally be induced in the proppant-carrying step, and a breaker may optionally be included in the viscous carrier fluid. Optionally, a step of injecting a viscous carrier fluid (optionally containing a breaker) containing proppant, at a rate and pressure sufficient to hold the fracture open, may be included after the step of injecting the formation-dissolving fluid and prior to allowing the fracture to close.

Yet another embodiment is a method of creating such flowpaths in which a formation-dissolving viscous carrier fluid containing proppant is injected at a rate and pressure sufficient to fracture the formation, and the fracture is allowed to close. A tip screenout may optionally be induced and the formation-dissolving viscous carrier fluid may optionally contain a breaker. In carbonates, the formation-dissolving viscous carrier fluid is preferably a surfactant-based viscoelastic fluid, and most preferably a self-diverting acid. In sandstones, the formation-dissolving viscous carrier fluid preferably contains hydrofluoric acid or a hydrofluoric acid precursor, and optionally contains a phosphonate.

Yet another embodiment is a method of increasing the effective surface area for the inflow of fluids from an existing natural fissure that is already in communication with a wellbore or a fracture, in which a formation-dissolving fluid is injected at a rate and pressure insufficient to fracture the formation. In carbonates, the formation-dissolving fluid is preferably a surfactant-based viscoelastic fluid, and most preferably a self-diverting acid. In sandstones, the formation-dissolving fluid preferably contains hydrofluoric acid or a hydrofluoric acid precursor, and optionally contains a phosphonate. The formation-dissolving fluid may optionally contain a viscosifying agent, in which case it may further optionally contain a proppant and/or a breaker.

DETAILED DESCRIPTION

Figure 1:
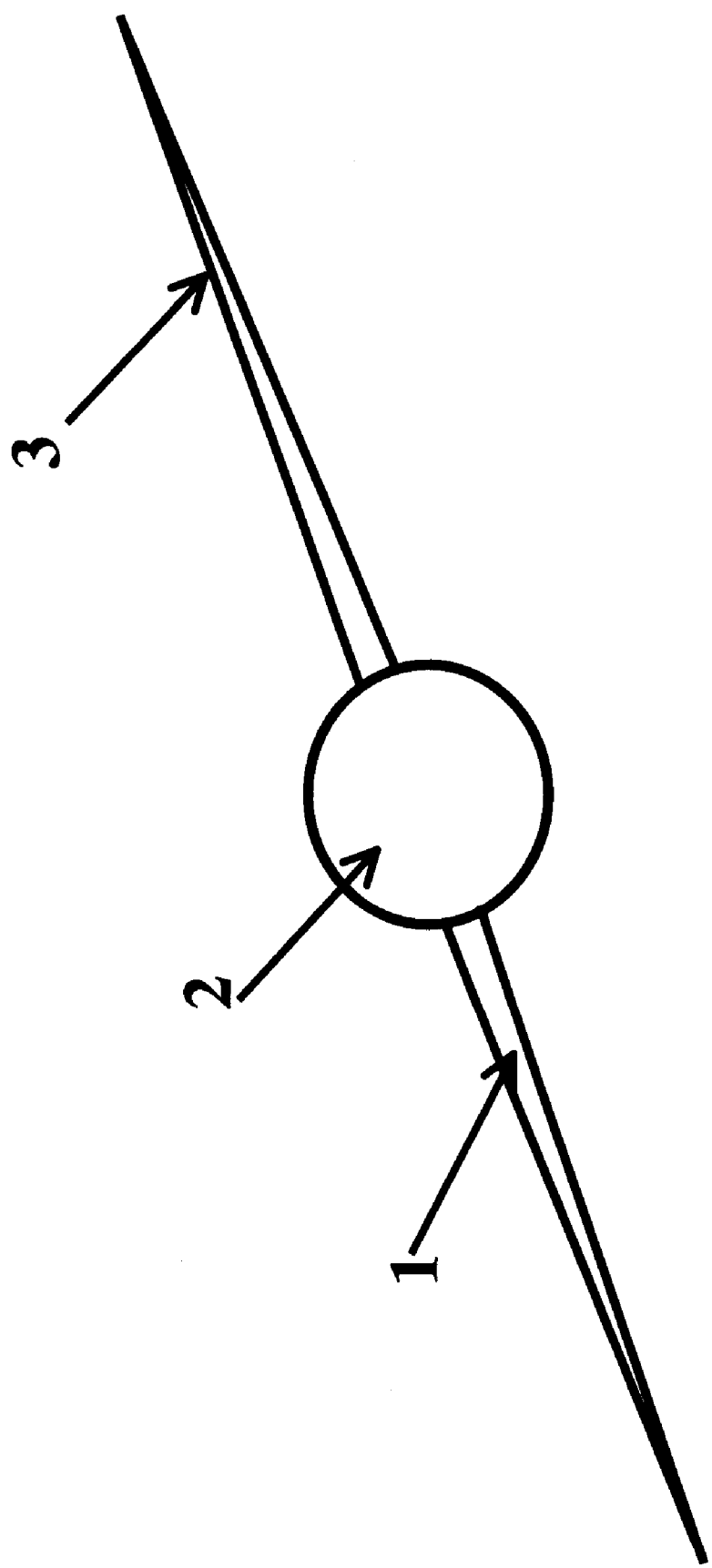
FIG. 1 shows a schematic of a conventional fracture.

The principles and the methods described below apply to any mineral type, although they will be discussed in terms of carbonates and sandstones. Formations that are considered to be carbonates may contain some sandstone and vice versa . Also, when we are describing situations in which the acid reacts with the first material with which it comes into contact, we will describe the location of that reaction as "near the wellbore" although, of course, there can be situations in which the location where the majority of the acid first comes into contact with the formation is farther away, for example when there are natural very high-conductivity streaks, or fractures or vugs. In this situation, "near the wellbore" should be interpreted as meaning primarily in the localized area most readily accessible to the acid.

Numerous studies of the wormholing process in matrix stimulation (for example carbonate acidizing) have shown that the dissolution pattern created by the flowing acid occurs by one of three mechanisms (a) compact dissolution, in which most of the acid is spent near the wellbore rock face; (b) wormholing, in which the dissolution advances more rapidly at the tips of a small number of highly conductive micro-channels, i.e. wormholes, than at the wellbore walls; and (c) uniform dissolution, in which many pores are enlarged, as typically occurs in sandstone acidizing. Compact dissolution occurs when acid spends on the face of the formation. In this case, the live acid penetration is commonly limited to within a few centimeters of the wellbore. Uniform dissolution occurs when the acid reacts under the laws of fluid flow through porous media. In this case, the live acid penetration will be, at most, equal to the volumetric penetration of the injected acid. (Uniform dissolution is also the preferred primary mechanism of conductive channel etching of the fracture faces in acid fracturing, as will be discussed further below.) The objectives of the acidizing process are met most efficiently when near wellbore permeability is enhanced to the greatest depth with the smallest volume of acid. This occurs in regime (b) above, when a wormholing pattern develops.

The dissolution pattern that is created depends on the acid flux. Acid flux is the volume of acid that flows through a given area in a given amount of time. Compact dissolution occurs at relatively low acid flux, wormholes are created at intermediate acid flux, and uniform dissolution occurs at high acid flux. There is not an abrupt transition from one regime to another. As the acid flux is increased, the compact pattern will change to one in which large diameter wormholes are created. Further increases in flux yield narrower wormholes, which propagate farther for a given volume of acid injection. Finally, as acid flux continues to be increased, more and more branched wormholes appear, leading to a fluid-loss limiting mode and less efficient use of the acid. This phenomenon has a detrimental effect on matrix stimulation efficiency, especially at the rate where branches develop secondary branches; there are many wormholes, but they do not achieve much depth. Ultimately, then, a virtually uniform pattern is observed. The most efficient process, in matrix acidizing, is thus one that will create wormholes with a minimum of branching and is characterized by the use of the smallest volume of acid to propagate wormholes a given distance.

Wormholing is the preferred dissolution process for matrix acidizing, for example of carbonate formations, because it forms highly conductive channels efficiently. Hence, optimization of the formation of wormholes is the key to success of such treatments. Injecting acid close to or above the optimal flux is very crucial to assure a successful carbonate acid treatment because of the risk of compact dissolution that may result from a slower acid injection. In other words, injecting acid at a high rate will generally promote success in matrix acid treatment, and injecting acid at the optimal flux rate will ensure the most efficient matrix acid treatment. However, the optimum is a complex function of the formation properties, acid properties, and acidizing conditions, such as temperature, so that there can be no simple rules as to what rates are best. The complexity stems directly from the range of dissolution patterns created by acid reaction with carbonates. When the acid flux is low, wormhole propagation is hindered due to slow acid convection, and the wormhole propagation rate is governed by balancing the convection and molecular diffusion. When the acid flux is high enough, the wormhole propagation is limited mainly by the reaction rate and the wormhole growth is governed by balancing the surface reaction and molecular diffusion.

In acid fracturing, on the other hand, in many cases the depth of stimulation (fracture length) is typically limited by rapid consumption (compact dissolution) of acid near the wellbore and by loss of acid through the fracture faces (commonly referred to as fluid leakoff or fluid loss). Fluid leakoff is a dynamic process that is influenced significantly by the formation of wormholes that form in the porous walls of the fracture. In acid fracturing, these wormholes have always been considered to be detrimental because they form close to the borehole and divert fluid from the fracture, consume large amounts of acid, and provide no benefit to the conductivity of the fracture.

We have found that it is advantageous to create propped fractures that have wormholes in the fracture faces far from the wellbore. This is done during a stimulation treatment, either during or after the propping step, with proper control of and balance between the reaction rate, the diffusion rate, and the pump rate (that controls the convection rate) for a given injected reactive formation-dissolving fluid, and a given formation temperature, pressure and composition. Through the control of the pump rate and of the fluid reactivity, reactive formation-dissolving fluid efficiency in creating desirably located wormholes is achieved and the stimulation is optimized. People skilled in the arts of matrix acidizing and/or acid fracturing have developed data, correlations and models of the reactions of reactive fluids with formation minerals. These data, correlations and models have been used in the past to avoid wormholing in acid fracturing and to maximize wormholing in matrix acidizing. Examples are found in U.S. patent application Ser. No. 10/065,441, which has a common assignee as the present application, and U.S. Pat. No. 6,196,318. These data, correlations and models can be used instead to select fluids and prepare stimulation job designs to promote wormholing in propped fractures.

In generating wormholes in the faces of propped fractures, some of the same problems would be encountered as in etching fracture faces during fracture acidizing. That is, care must be taken to ensure that all or most the acid reaction does not occur too close to the wellbore. It is known in the art that to achieve maximum effectiveness of the fracture acidizing process, it is often desirable to maximize the time the fracture is exposed to the acid, while limiting the amount of acid used to an economically reasonable amount. However, in fracture acidizing procedures used heretofore, less than desired results have often been achieved when the acid exposure time is maximized. For example, where the fracture acidizing treatment of a well formation has been carried out by first creating a fracture in the formation and then continuing to inject acid into the fracture at a high rate and pressure, in one or several stages, the fracture faces adjacent to the well are exposed to the etching of a lot of acid for a relatively long period of time, and yet the fracture faces furthest from the well may have received insufficient acid contact, even after a large quantity of acid has been injected. In some formations, the longer the acid is allowed to etch the rock faces adjacent to the well, the more likely that those rock faces will become softened or over-etched, so that upon closing, the faces will crush against each other, effectively destroying or restricting the flow channels created adjacent to the well. In other formations, which react more slowly, the acid contact time and effective acid penetration into the fracture may be insufficient to provide additional flow channels at a distance not adjacent to the well.

Although we have used and will continue to use the terms acidizing and acid fracturing because they are so ingrained in the industry, instead of the term "acid" we will often use the term "formation-dissolving fluid" because acids are not the only reactive fluids that will dissolve formation minerals. In some optimized methods of generating propped fractures having wormholes extending out from the fracture faces far from the wellbore, acids are not the optimal reactive fluids. Associated with the theoretical understanding of wormholing are recent advances in formation-dissolving fluid formulation. We will elaborate further below, but in addition to known gelled acids, emulsified acids, retarded acids which use either inorganic or organic acids, or mixtures of these conventional acids, now new unconventional reactive fluids which use mainly chelant systems, have also been developed and have been shown to generate wormholes in carbonate reservoir formations when the overall process of stimulation is optimized. Examples of unconventional formation-dissolving fluids include aminopolycarboxylic acids and their salts, which are sometimes called "non-acid reactive solutions" or NARS when they are basic. In addition, novel self-diverting wormholing acid systems, that are viscoelastic surfactant systems that change viscosity dramatically as a function of pH, are also available for this application that could enhance more generation of wormholes from the fracture surface.

The reactivity of the formation-dissolving fluid may be selected (for example with the use of fracture and/or acidizing simulator computer programs) on the basis of the flow rate and formation and fluid parameters. The reactivity of the formation-dissolving fluid can be controlled by varying the rate of reaction, the rate of mass transfer, or both. For example, the rate of reaction can be decreased by changing the type of formation-dissolving fluid, by changing the form of the fluid from a solution to an emulsion, by adding appropriate salts (which change the equilibrium constant for the surface reaction), or by increasing the pH of the formation-dissolving fluid. The rate of reaction can also be decreased by changing the physical processing conditions (e.g., by reducing the pump flow rate and/or pumping pressure, or by cooling the formation-dissolving fluid using external cooling means or internal cooling means (e.g., pumping a large pad stage, or by adding nitrogen or other gas that is inert in the process).

In general, in creating propped fractures having wormholes in the fracture faces far from the wellbore, simple mineral acids such as HCl, HF, or mixtures of HCl and HF, would be too reactive, and would spend too close to the wellbore. It would normally be necessary to use a less reactive formation-dissolving fluid. Non-limiting examples would be organic acids (such as acetic or formic acids, whose reactivities could be further adjusted by including varying amounts of sodium acetate or sodium formate respectively), chelating agents such as aminopolycarboxylic acids (such as ethylenediaminetetraacetic acid or hydroxyethylethylenediaminetriacetic acid (HEDTA), whose reactivities could be further adjusted by converting them partially or completely into sodium, potassium or ammonium salts or by adjusting the pH with, for example HCl), or retarded mineral acids (such as gelled or emulsified HCl, whose reactivity could be further adjusted by manipulation of the choice of and concentration of surfactant and of the oil/water ratio).

The chelating agents useful herein are a known class of materials having many members. The class of chelating agents includes, for example, aminopolycarboxylic acids and phosphonic acids and sodium, potassium and ammonium salts thereof. HEDTA and HEIDA (hydroxyethyliminodiacetic acid) are useful in the present process; the free acids and their Na, K, $NH_4^+$ salts (and Ca salts) are soluble in strong acid as well as at high pH, so they may be more readily used at any pH and in combination with any other reactive fluids (e.g., HCl). Other aminopolycarboxylic acid members, including EDTA,(nitrilotriacetic acid), DTPA (diethylenetriaminepentaacetic acid), and CDTA (cyclohexylenediaminetetraacetic acid) are also suitable. At low pH these latter acids and their salts may be less soluble. Examples of suitable phosphonic acids and their salts, include ATMP: aminotri(methylenephosphonic acid); HEDP: 1-hydroxyethylidene-1,1-phosphonic acid; HDTMPA: hexamethylenediaminetetra (methylenephosphonic acid); DTPMPA: diethylenediaminepentamethylenephosphonic acid; and 2-phosphonobutane-1,2,4-tricarboxylic acid. All these phosphonic acids are available from Solutia, Inc., St. Louis, Mo., USA, as DEQUEST (Registered Trademark of Solutia) phosphonates. Such materials are known in the oilfield. Prior art treatments did not, however, inject such fluids into the formation in such a manner as to maintain an optimum wormhole-forming efficiency and they were not as effective as the methods of the subject invention in creating wormholes in the formation extending out from the fracture faces. Particularly preferred chelant-based dissolvers are those containing hydroxyethylaminocarboxylic acids such as hydroxyethylethylenediaminetriacetic acid (HEDTA), hydroxyethyliminodiacetic acid (HEIDA), or a mixture thereof, as described in U.S. Pat. No. 6,436,880, which has a common assignee as the present application, and which is hereby incorporated in its entirety. Fluids containing such chelants may be viscosified.

Particularly preferred self-diverting wormholing acid systems are those made from solutions of certain surfactants, in particular certain betaines, optionally in conjunction with co-surfactants or lower alcohols. Examples are described in U.S. Pat. No. 6,399,546, U.S. patent application Ser. No. 10/054,161, and U.S. patent application Ser. No. 10/065,144, all of which have a common assignee as the present application, and all of which are hereby incorporated in their entirety. A highly-preferred self-diverting acid is made from erucic amidopropyl dimethyl betaine. These self-diverting wormholing acid systems have the important property that they have water-like viscosities as formulated (when they are strongly acidic) but their viscosities increase dramatically as the pH is increased above a value of about 2 to 2.5 as they react.

Conventional propped hydraulic fracturing methods, with appropriate adjustments if necessary, as will be apparent to those skilled in the art, are used in the methods of the invention. One preferred fracture stimulation treatment according to the present invention typically begins with a conventional pad stage to generate the fracture, followed by a sequence of stages in which a viscous carrier fluid transports proppant into the fracture as the fracture is propagated. Typically, in this sequence of stages the amount of propping agent is increased, normally stepwise. The pad and carrier fluid can be, and usually are, a gelled aqueous fluid, such as water or brine thickened with a viscoelastic surfactant or with a water soluble or dispersible polymer such as guar, hydroxypropylguar or the like. The pad and carrier fluids may contain various additives. Non-limiting examples are fluid loss additives, crosslinking agents, clay control agents, and mobility control agents such as fibers, breakers and the like, provided that the additives do not affect the stability or action of the formation-dissolving fluid.

The procedural techniques for pumping fracture stimulation fluids down a wellbore to fracture a subterranean formation are well known. The person that designs such fracturing treatments is the person of ordinary skill to whom this disclosure is directed. That person has available many useful tools to help design and implement the fracturing treatments, one of which is a computer program commonly referred to as a fracture simulation model (also known as fracture models, fracture simulators, and fracture placement models). Most if not all commercial service companies that provide fracturing services to the oilfield have one or more fracture simulation models that their treatment designers use. One commercial fracture simulation model that is widely used by several service companies is known as FracCADE™. This commercial computer program is a fracture design, prediction, and treatment-monitoring program that was designed by Schlumberger, Ltd. All of the various fracture simulation models use information available to the treatment designer concerning the formation to be treated and the various treatment fluids (and additives) in the calculations, and the program output is a pumping schedule that is used to pump the fracture stimulation fluids into the wellbore. The text "Reservoir Stimulation," Third Edition, Edited by Michael J. Economides and Kenneth G. Nolte, Published by John Wiley & Sons, (2000), is an excellent reference book for fracturing and other well treatments; it discusses fracture simulation models in Chapter 5 (page 5-28) and the Appendix for Chapter 5 (page A-15)), which are incorporated herein by reference.

In certain preferred embodiments, because the fracture area available for inflow of fluids into the wellbore is increased by the creation of wormholes, it is not necessary to generate a long fracture in the formation. In that case, to save fluids, hydraulic horsepower, time and money, a tip screenout may be desirable. In a tip screenout, the solids concentration at the tip of the fracture becomes so high due to fluid leak-off into the formation that the slurry is no longer mobile. The concentrated proppant slurry plugs the fracture, preventing additional growth of the fracture length. Additional pumping of the proppant/fluid slurry into the formation after the screenout occurs causes the fracture to balloon. The fracture grows in width rather than length, and large concentrations of proppant per surface area are placed in the fracture. Jobs may be deliberately designed to increase the probability of tip screenouts, and additional steps may be taken to induce tip screenouts, for example by the methods described in U.S. patent application Ser. Nos. 10/214,817 and 10/227,690 both of which have a common assignee as the present application.

Many of the formation-dissolving fluids of the invention, such as acids, would have an added advantage of being breakers for polymers, or for some of the surfactants and/or the micelles in VES"s. Another advantage to the method is that it would allow the operator to push live formation-dissolving fluid out further and more quickly because some of the volume of the fracture would already be taken up by proppant. Another advantage is that the operator would be able to pump into a propped fracture at much lower pressures, which would be an economic advantage. This would also allow the formation-dissolution step to be done at the optimal flow rate for wormholing in the right location rather than at a flow rate dictated by the need to keep the fracture open.

Figure 2:
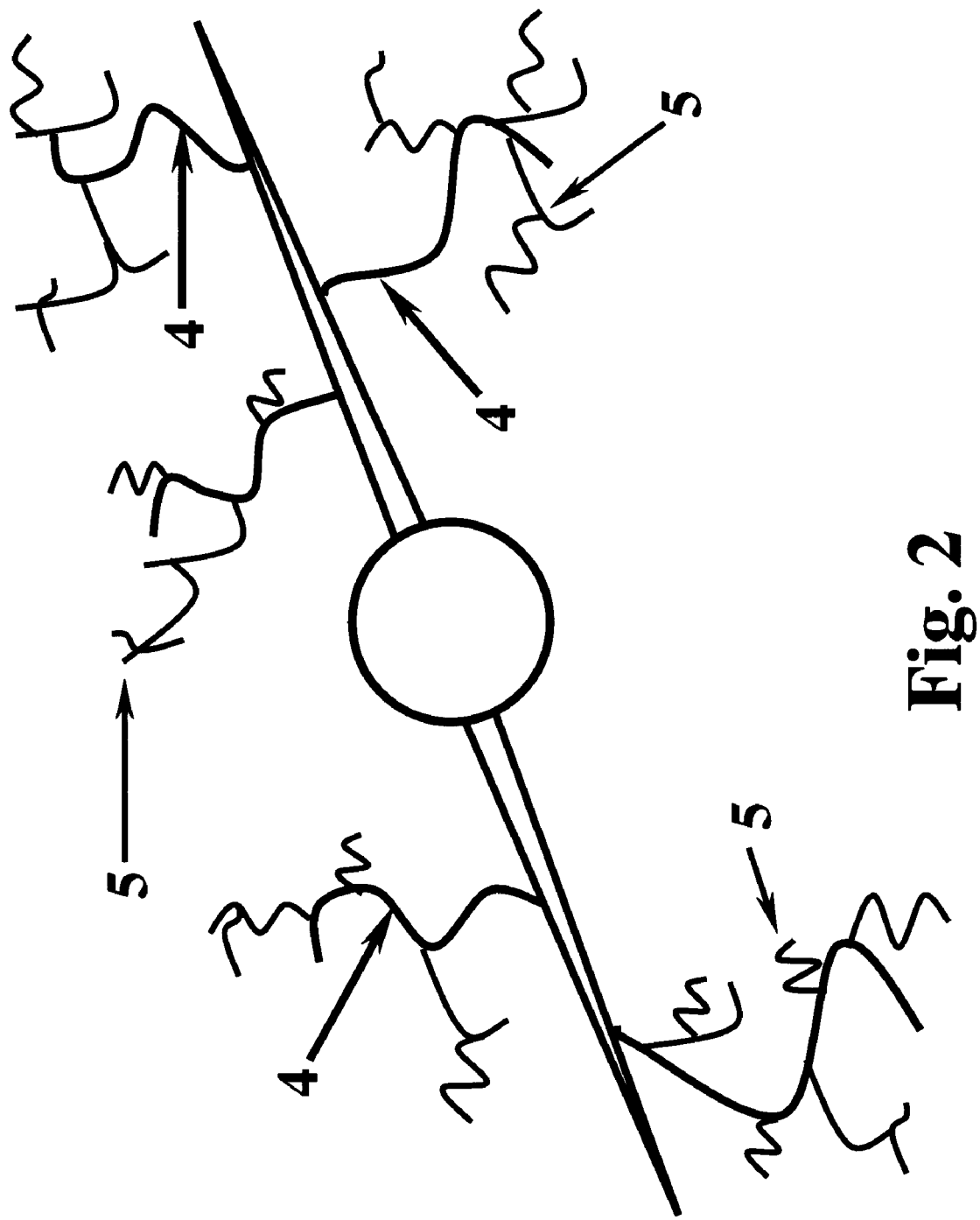
FIG. 2 shows a schematic of a fracture having primary and secondary wormholes.

FIG. 1 (not to scale) schematically shows a top view (assuming an approximately vertical fracture) of one half of a fracture [1] extending from a wellbore [2] into a formation. Not shown is the other half of the fracture extending in approximately the opposite direction from the wellbore. If the fracture is propped, the fracture would be filled throughout most of its volume with proppant (not shown). If the fracture was made by acid fracturing, the faces [3] of the fracture would be etched with channels (not shown). FIG. 2 shows a fracture having wormholes (primary channels) [4] extending from the faces of the fracture out into the formation and additional wormholes [5] (secondary channels) extending from the primary channels.

In conventional fractures such as the one shown in FIG. 1, the pathway available for fluids in the formation, at any appreciable distance from the fracture, to flow into the fracture is limited by the surface area of the faces of the fractures. The fluids must flow through the formation until they reach the fracture, and the permeability of the formation is much lower than that of the fracture. Local surface area increases right at the faces of the fracture due to differential etching, compact dissolution, or uniform dissolution do not decrease the length of the pathway that fluids must follow through the formation until they reach a high-permeability flow path; that is, they do not increase the effective surface area. However, wormholes, which are high fluid permeability channels that extend into the formation, do aid in the flow of fluids from the formation into the fracture, because they afford fluids opportunities to enter high permeability channels when they are still far from the fracture. When there are some secondary channels (secondary wormholes) branching off the main channels (primary wormholes) the opportunities may be even greater. The propped fractures having wormholes may be created in all types of formations, for example deep, hot carbonate formations and shallow, high permeability sandstone formations. When sandstone formations are treated, the formation-dissolving fluid preferably contains hydrofluoric acid, and may contain a phosphonate, such as by non-limiting example a phosphonate-containing polymer or diethylene triamine penta-(methylene phosphonic acid).

Specific methods of forming wormholes extending from the faces of propped fractures into a formation fall into two categories: a) a method in which a closed propped fracture is formed and then the wormholes are formed, and b) a method in which the fracture and channel system is formed before the closure occurs. The later steps of an approach in which a closed propped fracture is formed and then the wormholes are formed can also be used remedially, that is to improve the performance of a previously formed propped fracture. Any of the methods can also be used where there are already naturally occurring fractures or vugs (either or both of which we will call "fissures") in the formation that are in contact with the wellbore, either directly or as a consequence of the creation of a hydraulic fracture. It should be understood that the wormhole-creating formation-dissolution fluids and methods of the Invention are effective at rates and pressures above or below the fracture rates and pressures for any formation. It should also be understood that when a formation-dissolving fluid is being injected under optimized wormhole-creating conditions, then in general the longer the pumping is continued, the deeper the wormholes will penetrate into the formation and the better the results will be. Finally it should be understood that mechanical or chemical diverters may be used to ensure that the fluids used enter the formations of interest.

Methods of forming propped fractures with wormholes have been tried in the past, but generally have been unsatisfactory, not only because the dynamics of wormhole formation were not well understood and the computer programs available for determining the optimal job designs were inadequate, but also because certain formation-dissolving fluids were unavailable. For example, even with retarded acids, the acid would not penetrate the length of the propped fracture. Two new types of fluids have recently been developed that help make these methods possible, especially for treatment of carbonates. (When sandstone formations are treated, the formation-dissolving fluids preferably contain hydrofluoric acid, and may contain a phosphonate, such as by non-limiting example a phosphonate-containing polymer or diethylene triamine penta-(methylene phosphonic acid).)

The two new types of fluids referred to above are suitable at different temperatures. At lower temperatures, for example below about 300° F., a fairly strong formation-dissolving fluid must be used, so the key to success is to ensure that the wormholes are not all formed too close to the wellbore. At higher temperatures, for example above about 300° F., a fluid is needed that is not too reactive at low temperatures but does react at higher temperatures. We have found that surfactant-based fluids that have a low viscosity (approximately comparable to that of water under comparable conditions) when they are formulated in strong acid but develop micellar structures that have high viscosities when the acid spends and the pH rises to about 2 to about 2.5 are particularly suitable at the lower temperatures. These materials, called "viscoelastic diverting acids" or VDA"s, have the additional valuable property that they lose the high viscosity when they are contacted with formation fluids, either formation water, condensate or oil. (If the principal fluid in the formation is a hydrocarbon that would be a gas at surface pressures, for example methane, there are breakers available that can destroy either the micellar structure or the surfactant itself.) Examples of VDA"s were given above.

The methods will be described without discussions of the pad, although it is to be understood that pads are generally used. To use a VDA in a method in which a closed propped fracture is formed and then the wormholes are formed, a conventional hydraulic fracture is generated with conventional polymeric viscosifiers in the carrier fluid. The carrier fluid may contain breakers, breaker aids, and clean-up additives. The fracture is allowed to close and time is allowed for the fluid to break if necessary; the fracture may also optionally be flowed back. At this stage, the fracture contains proppant and either broken fracture fluid or formation fluid. The low-viscosity, high-acidity VDA is then injected at a pressure below fracture pressure and at a flow rate calculated to favor wormholing, especially a network of branched wormholes, when the temperature, VDA acid concentration and formation properties are taken into account. Not to be limited by theory, but it is believed that the VDA"s works in the present process as follows. The first of the VDA fluid injected creates a wormhole or network of wormholes at or near the wellbore. However, as the acid spends, the viscosity of the VDA in the initially generated wormhole or network of branched wormholes, increases and subsequently injected acid cannot flow into the wormhole but rather flows farther into the fracture and initiates generation of another wormhole or network of branched wormholes. As the acid spends, the viscosity of that VDA also increases and the process is repeated progressively farther and farther away from the borehole until wormholes have been generated at many points on the face of the original fracture. After the wormhole-generating VDA injection is stopped, the viscosity of the VDA in the wormholes is reduced, either because of the inherent instability of the micelles or the surfactant due to time and temperature, or by breakers included in the original VDA formulation, or by reducing the wellhead pressure and reversing the flow and allowing formation fluids to contact the VDA.

The fluids used at higher temperatures are chelating agents as described above. Particularly preferred examples are chelant-based dissolvers containing hydroxyethylaminocarboxylic acids such as hydroxyethylethylenediaminetriacetic acid (HEDTA), hydroxyethyliminodiacetic acid (HEIDA), or a mixture thereof, as mentioned above. These materials have low reactivity, low viscosity, but high dissolving capacity. Previously available formation-dissolving fluids were strong acids, retarded acids, or organic acids. The reasons why strong acids cannot be used have been made very evident. Retarded acids cannot be used because they are either viscous or emulsions; neither form of fluid can be injected into a propped fracture without very deleterious results. Viscous fluids would require high hydraulic horsepower and/or would have to be pumped at very low rates to prevent fracture propagation and/or would displace proppant from the near wellbore region of the fracture. In addition to possibly being viscous, maintaining the stability of emulsions at high temperatures and in flow through a proppant pack would be difficult. Adding an oil-wetting surfactant to aqueous acid to form an emulsion in an effort to create a barrier to acid migration to the rock surface often requires continuous injection of oil during the treatment. Moreover these systems are often ineffective at high formation temperatures and high flow rates since absorption of the surfactant on the formation rock is diminished. Emulsified acid systems are also limited by increased frictional resistance to flow. Organic acids are not suitable because they are far more expensive than mineral acids, and, while they have a lower reaction rate, they also have a much lower reactivity in fact, they do not react to completion, but rather an equilibrium with the formation rock is established. Hence one mole of HCl yields one mole of available acid (i.e., $H^+$), but one mole of acetic acid yields substantially less than one mole of available acid. However, because the described chelant-based materials have low reactivity at high temperature, low viscosity, but high dissolving capacity, they can be injected into propped fractures at the rates required to generate wormholes without propagating fractures or displacing proppant.

For the same reasons, these two types of fluids are preferred (although others can be used) in the second category of methods of forming propped fractures having wormholes extending from their faces into the formation: those in which the entire fracture and channel system is formed before the closure occurs. There are four variations on this approach:

First, the carrier fluid in the early proppant-transporting stages is a conventional polymer-viscosified aqueous fluid and the carrier fluid in the later proppant-transporting stages is a viscous formation-dissolving fluid. Each is injected at pressures and rates sufficient to generate and propagate fractures. By non-limiting example, the carrier fluid in the early stages is viscosified with guar or a substituted guar containing a breaker such as an oxidizing agent and/or enzyme. A fluid that does not dissolve the formation is used in these stages so that a fracture of the desired size and shape is generated without the problems that would be encountered if the carrier fluid were to react with the formation near the wellbore. Since the effective surface area of the fracture is going to be increased next by the generation of a wormhole system away from the wellbore, the fracture need not necessarily be long and so optionally the job is designed so that a tip screenout occurs. The viscosified formation-dissolving carrier fluid in the remaining stages is by non-limiting example a viscoelastic surfactant-based micellar system containing an acid or a chelating agent or both. The viscosity of such a system depends upon such factors as the surfactant concentration, the environment (such as the pH and the nature and concentration of salts), the time, the temperature, and the presence of other components such as alcohols, co-surfactants and breakers. The reactivity of such a system depends upon some of the same factors as well as on the nature and concentration of the formation-dissolving component. The nature of these dependencies are known, and thus the relative rates at which this carrier fluid loses viscosity and reacts with the formation are adjusted, and taking into account the flow rate necessary to maintain the needed pressure and to transport proppant, the system is designed so that this viscosified formation-dissolving carrier fluid transports proppant into the fracture and then reacts with the formation to create wormholes, simultaneously or subsequently losing its viscosity. In a particularly preferred embodiment, the viscosified formation-dissolving carrier fluid is a VDA. As is almost always the case, laboratory experiments and/or computer modeling are used to optimize this and the other job designs.

Second, the fracture is created with a VDA, optionally containing a chelant, which has sufficient viscosity and leak-off control to create a fracture of the desired dimensions. As was explained above in the description of the approach in which a closed propped fracture is formed and then the wormholes are formed, the conditions are adjusted so that the VDA forms a successive sequence of wormholes farther and farther from the borehole. This may occur during fracture growth or after the final fracture length has been achieved, that is, the pumping rate may be reduced at some point so that the loss of fluid due to wormhole formation is balanced by pumping to keep the fracture open. Then, proppant-laden stages, viscosified with polymeric or VES viscosifiers, are injected to fill the fracture with proppant. This is done at a pressure and flow rate at least sufficient to hold the fracture open. Optionally, the job is designed so that a tip screenout occurs as soon as, or shortly after, the start of proppant stages so that the fracture tends to widen rather than lengthen. Fracture propagation and/or wormhole formation may optionally occur during the proppant-placing stage as well. This embodiment has the advantage that the wormholes may be filled with proppant.

Third, a propped fracture is created with a conventional polymeric or VES-based viscosified carrier fluid and then, while the fracture is held open, a formation-dissolving fluid, such as a VDA, is injected. The carrier fluid may contain a breaker, or a breaker may be injected with the formation-dissolving fluid. The VES, if used, is a system that would be a VDA if it were strongly acidic. In this sequence, the VDA breaks the polymer or the VES (either of which is chosen such that it can be broken by strong acids), so that the VDA can reach deep into the propped fracture and form wormholes as has been described above. If the carrier fluid is not fully broken by the formation-dissolving fluid front, some additional fracture propagation may occur (which could be beneficial) and some proppant may be moved away from the wellbore.

Mobility-reducing agents such as fibers, or the use of resin-coated proppants can help prevent proppant movement further into the fracture, if desired. Alternatively, a final proppant-carrying viscosified stage or stages are used to replace proppant in the near-wellbore region of the fracture. In a preferred embodiment, the carrier fluid is a VES and the formation-dissolving fluid is a VDA. In a most-preferred embodiment, the pad, the carrier fluid, and the formation-dissolving fluid all contain erucic amidopropyl dimethyl betaine.

Finally, a propped fracture is created with a viscous, formation-dissolving carrier fluid that has sufficient viscosity and leak-off control to create a propped fracture of the desired dimensions. The conditions can be adjusted so that leak off of some of the viscous, formation-dissolving carrier fluid will form wormholes along the fracture during fracture growth, and optionally so that the wormholes are extended during and after fracture closure. Optionally, the job is designed so that a tip screenout occurs. This embodiment also has the advantage that the wormholes may be filled with proppant.

All of the fluids injected in the methods of the invention, such as the pad, the viscous proppant-carrying fluid and the formation-dissolving fluid, may contain various additives well known in stimulation treatments (such as, for example, corrosion inhibitors, iron control agents, surfactants, clay control additives, buffers, scale inhibitors and the like) provided that the additives do not interfere with the desired action or stability of the fluid. It would be expected, and within the scope of the invention, to conduct laboratory tests or run computer simulations to ensure that such additives were suitable.

Although the methods have been described here for, and are most typically used for, hydrocarbon production, they may also be used in injection wells and for production of other fluids, such as water or brine.

The invention claimed is:

1. A method of forming a fracture having increased effective surface area for the inflow of fluids into said fracture from a subterranean formation penetrated by a wellbore comprising the sequential steps of:

a. injecting a polymeric viscous carrier fluid containing proppant at a rate and pressure sufficient to fracture said formation;
b. injecting a formation-dissolving viscous carrier fluid containing proppant at a rate and pressure sufficient to hold said fracture open; and
c. allowing said fracture to close.

2. The method of claim 1 wherein a tip screenout is induced in said step of injecting a polymeric viscous carrier fluid containing proppant at a rate and pressure sufficient to fracture said formation.

3. The method of claim 1 wherein said polymeric viscous carrier fluid comprises a breaker.

4. The method of claim 1 wherein said formation-dissolving viscous carrier fluid comprises a surfactant-based viscoelastic fluid.

5. The method of claim 1 wherein said formation-dissolving viscous carrier fluid comprises a self-diverting acid.

6. The method of claim 1 wherein said formation-dissolving viscous carrier fluid comprises a breaker.

7. The method of claim 1 wherein the subterranean formation is a sandstone and the formation-dissolving fluid comprises a component selected from the group consisting of hydrofluoric acid and a hydrofluoric acid precursor.

8. The method of claim 7 wherein the formation-dissolving fluid further comprises a phosphonate.

9. The method of claim 1 wherein said step of injecting a formation-dissolving viscous carrier fluid containing proppant is carried out at a rate and pressure sufficient to propagate said fracture.

10. A method of forming a fracture having increased effective surface area for the inflow of fluids into said fracture from a subterranean formation penetrated by a wellbore comprising the sequential steps of:

a. injecting a viscous carrier fluid containing proppant at a rate and pressure sufficient to fracture said formation;
b. injecting a formation-dissolving fluid at a rate and pressure sufficient to hold said fracture open;
c. injecting a viscous carrier fluid containing proppant, at a rate and pressure sufficient to hold said fracture open, after injection of said formation-dissolving fluid and prior to allowing said fracture to close, and
d. allowing said fracture to close.

11. The method of claim 10 wherein said viscous carrier fluid further comprises a breaker.

12. The method of claim 10 wherein the viscous carrier fluid and the formation-dissolving fluid each comprise erucic amidopropyl dimethyl betaine.

* * * * *